US011762860B1

(12) United States Patent
Rahman et al.

(10) Patent No.: US 11,762,860 B1
(45) Date of Patent: Sep. 19, 2023

(54) DYNAMIC CONCURRENCY LEVEL MANAGEMENT FOR DATABASE QUERIES

(71) Applicant: Amazon Technologies, Inc., Seattle, WA (US)

(72) Inventors: Mohammad Rezaur Rahman, Fremont, CA (US); George Constantin Caragea, Redwood City, CA (US); Raj Narayan Sett, Chelmsford, MA (US); Gaurav Saxena, Cupertino, CA (US); Naresh Chainani, Mountain View, CA (US); Chunbin Lin, Dublin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 26 days.

(21) Appl. No.: 17/118,288

(22) Filed: Dec. 10, 2020

(51) Int. Cl.
*G06F 16/2455* (2019.01)
*G06F 16/2453* (2019.01)
*G06N 20/00* (2019.01)
*G06F 16/23* (2019.01)
*G06F 18/214* (2023.01)
*G06F 11/34* (2006.01)

(52) U.S. Cl.
CPC .... *G06F 16/24568* (2019.01); *G06F 11/3409* (2013.01); *G06F 16/2308* (2019.01); *G06F 16/24539* (2019.01); *G06F 16/24542* (2019.01); *G06F 18/214* (2023.01); *G06N 20/00* (2019.01)

(58) Field of Classification Search
CPC ........... G06F 16/24568; G06F 16/2308; G06F 16/24539; G06F 16/24542; G06F 11/3409; G06K 9/6256; G06N 20/00
See application file for complete search history.

(56) References Cited

U.S. PATENT DOCUMENTS

| 5,778,224 | A | 7/1998 | Tobe et al. |
| 6,769,017 | B1 | 7/2004 | Bhat et al. |
| 7,058,622 | B1 | 6/2006 | Tedesco |
| 8,762,366 | B1 | 6/2014 | Becerra et al. |
| 8,949,222 | B2 * | 2/2015 | Konik ............... G06F 16/24561 |
| | | | 707/693 |
| 9,032,017 | B1 | 5/2015 | Singh et al. |
| 9,390,130 | B2 | 7/2016 | Kakarlamudi et al. |
| 9,477,710 | B2 | 10/2016 | Narasayya et al. |

(Continued)

OTHER PUBLICATIONS

Varun Gupta, et al, "Self-Adaptive Admission Control Policies for Resource-Sharing Systems", ACM, SIGMETRICS/Perfomance '09, Jun. 15-19, 2009, pp. 1-14.

(Continued)

*Primary Examiner* — Dangelino N Gortayo
(74) *Attorney, Agent, or Firm* — S. Scott Foster; Kowert, Hood, Munyon, Rankin & Goetzel, P.C.

(57) ABSTRACT

Database systems may dynamically management concurrency levels for performing queries. A query may be received at a database system and a memory usage for the query may be predicted. A determination may be made as to whether available memory is enough to satisfy the predicted memory usage for the query. If the available memory is enough to satisfy the predicted memory usage for the query, then an increase in a concurrency level for performing queries at the database system may be made. The query may be allowed to execute concurrently with other queries according to the increased concurrency level.

20 Claims, 9 Drawing Sheets

(56) References Cited

U.S. PATENT DOCUMENTS

| | | | |
|---|---|---|---|
| 10,147,150 B1* | 12/2018 | Carrington | G06Q 50/16 |
| 11,176,129 B2* | 11/2021 | Fan | G06F 9/52 |
| 2005/0021511 A1 | 1/2005 | Zarom | |
| 2005/0192937 A1 | 9/2005 | Barsness et al. | |
| 2006/0294058 A1 | 12/2006 | Zabback et al. | |
| 2008/0133608 A1 | 6/2008 | Brown et al. | |
| 2008/0195577 A1 | 8/2008 | Fan et al. | |
| 2008/0270346 A1 | 10/2008 | Mehta et al. | |
| 2008/0281784 A1 | 11/2008 | Zane et al. | |
| 2009/0254774 A1 | 10/2009 | Chamdani et al. | |
| 2010/0082603 A1 | 4/2010 | Krompass et al. | |
| 2011/0153662 A1 | 6/2011 | Stanfill et al. | |
| 2011/0179017 A1 | 7/2011 | Meyers et al. | |
| 2012/0102006 A1* | 4/2012 | Larson | G06F 16/2365 707/703 |
| 2013/0226903 A1 | 8/2013 | Wu et al. | |
| 2014/0019415 A1 | 1/2014 | Barker et al. | |
| 2016/0203404 A1* | 7/2016 | Cherkasova | G06N 5/04 706/12 |
| 2017/0213257 A1 | 7/2017 | Murugesan et al. | |
| 2017/0316078 A1 | 11/2017 | Funke et al. | |
| 2017/0372230 A1 | 12/2017 | Kuromatsu et al. | |
| 2018/0060132 A1 | 3/2018 | Maru et al. | |
| 2018/0210916 A1* | 7/2018 | Zhang | G06F 16/24542 |
| 2018/0314735 A1* | 11/2018 | Liu | G06F 16/24532 |
| 2019/0370146 A1* | 12/2019 | Babu | G06F 11/3089 |
| 2020/0104397 A1* | 4/2020 | Fan | G06F 16/24545 |
| 2020/0219028 A1* | 7/2020 | Papaemmanouil | G06Q 20/145 |
| 2020/0226122 A1* | 7/2020 | Koppelaars | G06F 16/2308 |
| 2021/0004357 A1* | 1/2021 | Bagchi | G06N 20/00 |
| 2021/0240713 A1* | 8/2021 | Kondiles | G06F 16/24568 |

OTHER PUBLICATIONS

U.S. Appl. No. 16/007,697, filed Jun. 13, 2018, Gaurav Saxena, et al.

U.S. Appl. No. 16/102,545, filed Aug. 13, 2018, Bharven Avalani, et al.

U.S. Appl. No. 16/364,055, filed Mar. 25, 2019, Mingda Li, et al.

U.S. Appl. No. 16/370,614, filed Mar. 29, 2019, Ippokratis Pandis, et al.

* cited by examiner

DYNAMIC CONCURRENCY LEVEL MANAGEMENT FOR DATABASE QUERIES

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. For example, data processing is often measured by the speed at which requests to access data are performed. Some types of data access requests require intensive computational and storage access workloads, while other types of data access requests may only involve small amounts of work to process.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for dynamic concurrency level management for database queries are described herein. Concurrent execution of queries (sometimes referred to as multi-programming) offers database systems with the opportunity to efficiently perform queries and other database system workloads, in some embodiments. For example, query execution may include different steps or operations which may not require constant use of a processor, such as scenarios where operations to read or write data are being performed. A concurrency level may be implemented by database systems, in various embodiments, to limit a number of concurrently executing queries at a given time. In this way, a database system can work within the concurrency level to make forward progress on multiple queries utilizing different resources of the database system (e.g., processor, I/O, memory, network, etc.) at a time. Because workloads for database systems can change (e.g., due to a changing number or type of queries) and can be difficult to predict, techniques for dynamically management concurrency levels can quickly adjust the concurrency level to maintain optimal database system performance for different workloads, instead of applying a statically defined concurrency level (e.g., manually specified) which may not be performant for many different types of workloads.

Figure 1:
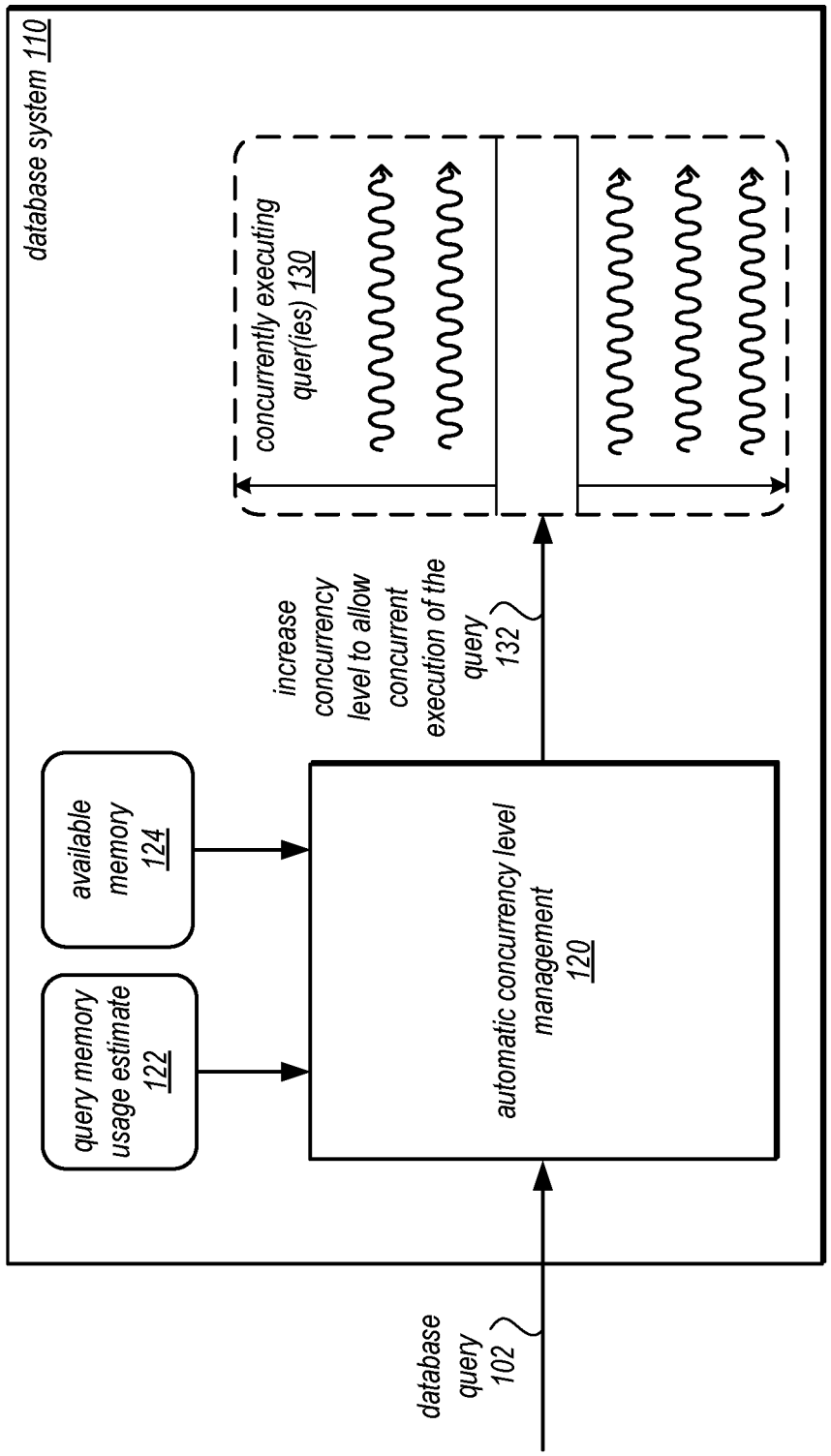
FIG. 1 is a logical block diagram illustrating dynamic concurrency level management for database queries, according to some embodiments

FIG. 1 is a logical block diagram illustrating dynamic concurrency level management for database queries, according to some embodiments. Database system 110 may be one of various types of database systems (e.g., relational, non-relational, distributed, service-based, as discussed in detail with regard to FIGS. 2-5), in some embodiments. Database system 110 may receive a database query 102 and execute the query to return a query result that provides data specified according to the features (e.g., predicates) of database query 102. In various embodiments, database system 110 may implement automatic concurrency level management 120. Automatic concurrency level management 120 may determine whether to adjust (or not) a concurrency level for database system 110 when database query 102 is received.

For example, as discussed in detail below with regard to FIGS. 4, 5, and 6, automatic concurrency level management 120 may obtain (or determine) a query memory usage estimate 122. This estimate 122 may then be compared with available memory 124 for performing additional database queries. If the available memory 124 is sufficient for estimate 122, then database query 102 may be performed by increasing the concurrency level of concurrently executing quer(ies) 130 at database system 110. As discussed in detail below with regard to FIGS. 5, 7 and 8, in some scenarios, automatic concurrency level management 120 may not increase concurrency levels, but decrease them or changing scheduling policies to ensure "liveness" of database system 110. In this way, concurrency levels may be decreased upward or downward to maintain an optimal execution performance for queries without sacrificing the "liveness" of the database system 110 (e.g., not sacrificing the performance of short queries for long-running queries that may otherwise block performance of the short queries).

Please note that the previous description of a database system, concurrency level management, concurrently executing queries, query memory usage estimate, and available memory are logical descriptions and thus are not to be construed as limiting as to the implementation of a database system, concurrency level management, concurrently executing queries, query memory usage estimate, and available memory, or portions thereof. For example, database system 110 may be implemented as a cluster or group of nodes that perform data processing, such as discussed below with regard to FIGS. 2-4.

This specification begins with a general description of a provider network that implements database services (or other data storage or processing services) that may implement using computer resources to perform dynamic concurrency level management for database queries. Then various examples of one such database service, including different components/modules, or arrangements of components/module that may be employed as part of implementing the techniques are discussed. A number of different methods and techniques to implement dynamic concurrency level management for database queries, some of which are illustrated in accompanying flowcharts, are then discussed. Finally, a description of an example computing system upon which the various components, modules, systems, devices, and/or nodes may be implemented is provided. Various examples are provided throughout the specification.

Figure 2:
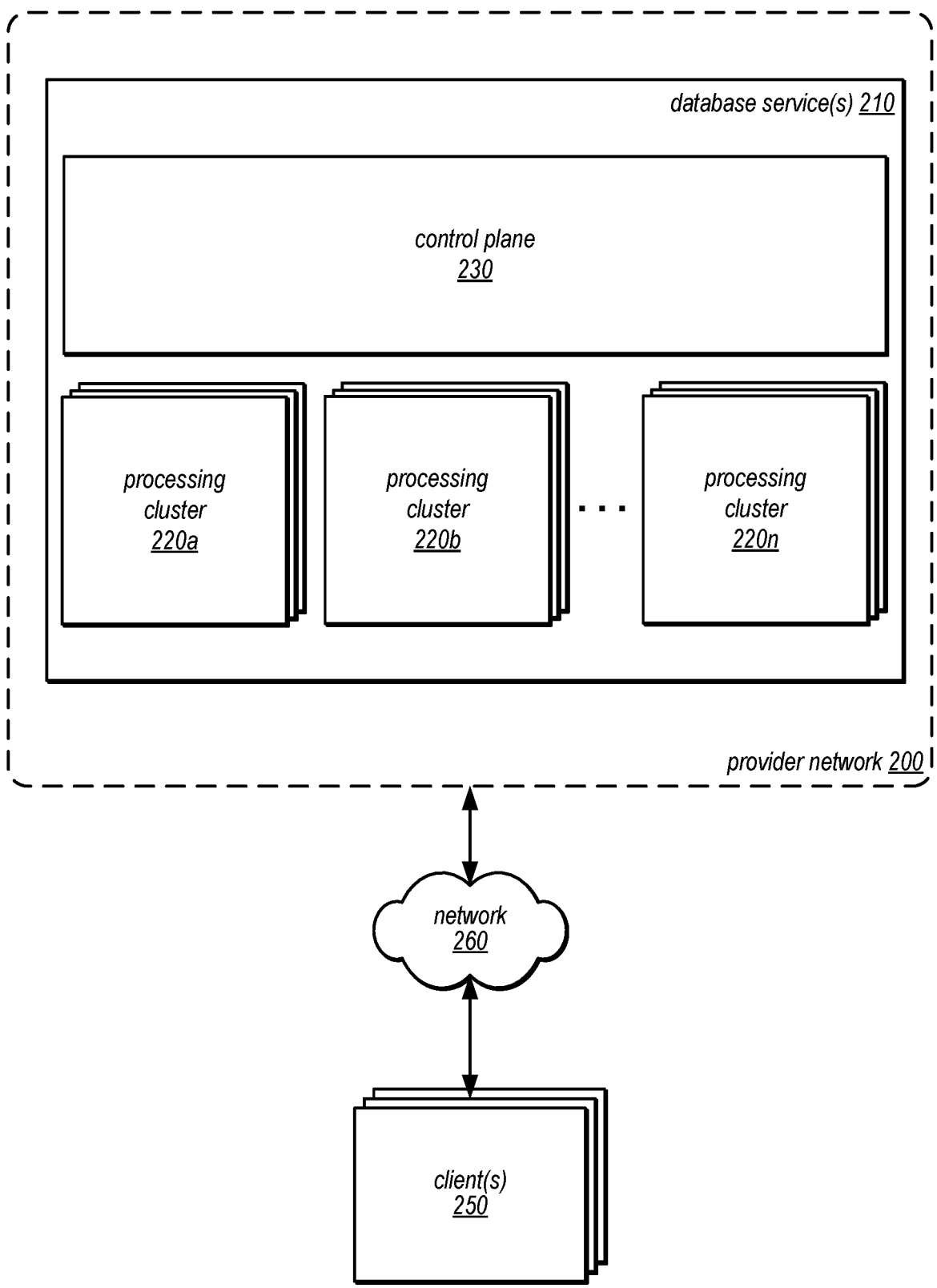
FIG. 2 is a logical block diagram illustrating a provider network offering a database service that implements using dynamic concurrency level management for database queries for databases hosted in the database service, according to some embodiments.

FIG. 2 is a logical block diagram illustrating a provider network offering a database service that implements using dynamic concurrency level management for database queries for databases hosted in the database service, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200, in one embodiment. In some embodiments, provider network 200 may implement various computing resources or services, such as database service(s) 210 or other data processing services, (e.g., a map reduce service, a data warehouse service, and other large scale data processing services) and/or any other type of network based services (which may include a virtual compute service and various other types of storage, processing, analysis, communication, event handling, visualization, data cataloging, data ingestion (e.g., ETL), and security services not illustrated), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of database service(s) 210 may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 210 that is distributed across multiple physical resources, as discussed below, and the database system may be scaled up or down on an as needed basis, in one embodiment. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

In some embodiments, database service(s) 210 may include services that process requests to data that is not stored in fully structured storage (e.g., non-relational or NoSQL databases). Database services 210 may access the data that is semi-structured or not-structured in storage, such as data objects of unstructured or semi-structured data in a separate data storage service, in one embodiment. In other embodiments, database services 210 may locally store, managed, and access semi-structured or not-structured data (e.g., an object-based and/or key-value data store that stores tables joined with tables in other services, such as database service(s) 210 or the same storage service).

Generally speaking, clients 250 may encompass any type of client that can submit network-based requests to provider network 200 via network 260, including requests for database service(s) (e.g., a request or other query to a database in database services 210, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database services 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture. In some embodiments, clients of database service(s) 210 may be internal to or implemented as part of provider network 200 (e.g., on another provider network service not illustrated).

In some embodiments, a client 250 may provide access to provider network 200 to other applications in a manner that is transparent to those applications. For example, client 250 may integrate with an operating system or file system to provide storage on one of database service(s) 210 (e.g., a database table that stores data on behalf of the operating system or file system). However, the operating system or file system may present a different storage interface to applications, such as a conventional file system hierarchy of files, directories and/or folders. In such an embodiment, applications may not need to be modified to make use of the storage system service model. Instead, the details of interfacing to a database service(s) 210 may be coordinated by client 250 and the operating system or file system on behalf of applications executing within the operating system environment. Similarly, a client 250 may be an analytics application that relies upon database services to execute various queries for data already ingested or stored in the database service 210 or data stored in a data lake hosted in other storage service(s) in provider network 200 that may be accessible to a query engine implemented as part of database service(s) 210).

Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In at least some embodiments, a database service 210 may be a data warehouse service or other database that stores data across multiple storage locations (e.g., across different nodes in a processing cluster). A database service, such as database service 210, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") database service (e.g., such as data warehouse service). However, various versions of the components discussed below as may be equally adapted to implement embodiments for various other types of systems, such as row-oriented database systems. Therefore, the following examples are not intended to be limiting as to various other types or formats of structured data that may be stored, accessed, or otherwise managed by database service 210.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Figure 8:
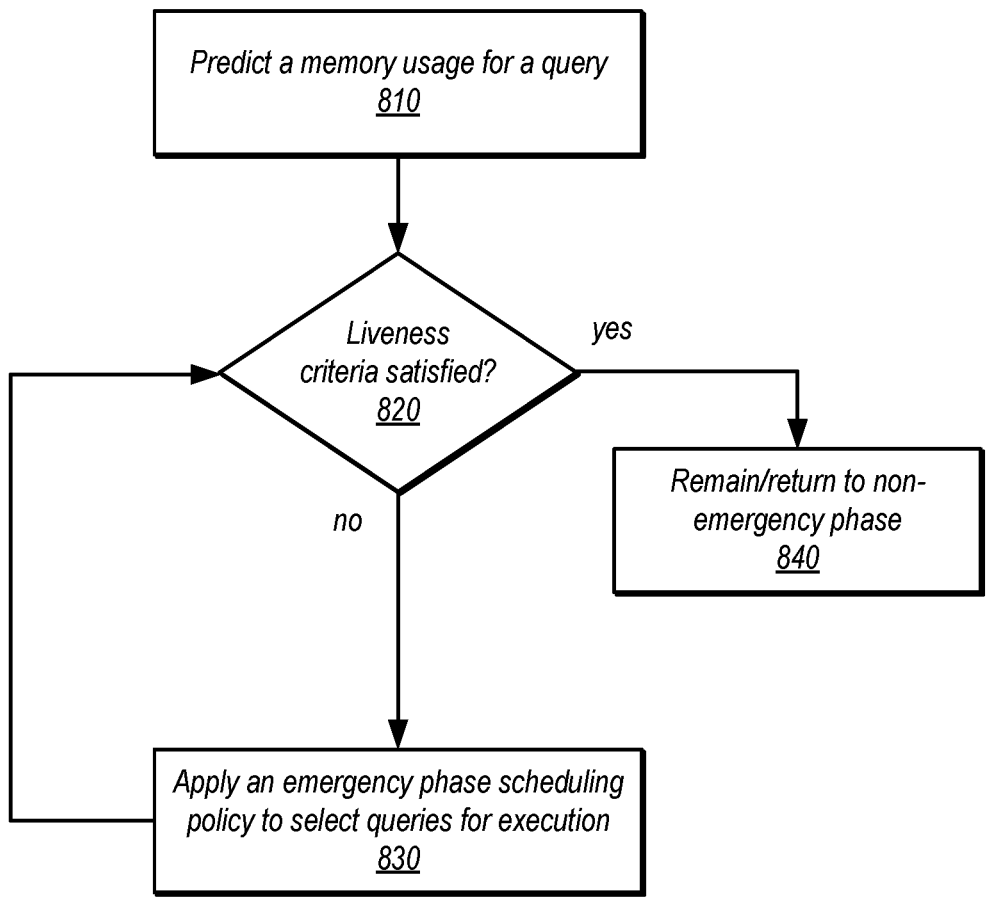
FIG. 8 is a high-level flowchart illustrating methods and techniques to implement an emergency phase for dynamic concurrency level management, according to some embodiments.

Database service 210 may be implemented by a large collection of computing devices, such as customized or off-the-shelf computing systems, servers, or any other combination of computing systems or devices, such as the various types of systems 1000 described below with regard to FIG. 8, in some embodiments. Different subsets of these computing devices may be controlled by control plane 230. Control plane 230, for example, may provide an interface to clients or users who wish to interact with the processing clusters 220 managed by control plane 230. For example, the interface may implement one or more Application Programming Interfaces (APIs) to allow client systems to programmatically invoke database service operations, functions, or other features and/or the interface may implement or provide one or more graphical user interfaces (GUIs) for storage clients (e.g., as a web-console). The interface may allow clients to select various control functions offered by database service 210 for the processing clusters 220 hosted in the database service 210, in some embodiments. For example, a user may make adjustments to workload allocations, prioritization schemes, cluster size, network mappings or other operations or tasks for performing a query.

In at least some embodiments, control plane 230 may implement cluster performance monitoring, which may track, store, organize and/or evaluate performance metrics collected for queries performed at processing clusters 220. For example, performance monitoring may receive reported metrics from a leader node (as discussed below with regard to FIG. 3, and store them in a common storage location (e.g., in a file, direct, or object within a storage service) for the database (or user account associated with the database). In some embodiments, performance monitoring may evaluate processing cluster performance in order to trigger the performance of various control plane 230 operations (e.g., node replacement or failover operations). In some embodiments, cluster scaling may be implemented as part of control plane 230 to respond to user requests to add or remove node from a processing cluster or automatically triggered requests/ events to add or remove nodes (e.g., based on utilization thresholds for processing, storage, network, or other cluster resource).

Various clients (or customers, organizations, entities, or users) may wish to store and manage data using database service 210, in some embodiments. Processing clusters, such as processing clusters 220a, 220b, and 220n may respond to various requests, including write/update/store/redistribute requests (e.g., to add data into storage) or other queries for data (e.g., such as a Server Query Language request (SQL) for particular data), as discussed below with regard to FIG. 3, along with many other data management or storage services, in some embodiments. Queries may be directed to data that is locally hosted as part of database service 210 or stored elsewhere that is fully structured data or queries directed to data that is not-structured, such as log records, event data, or machine generated data stored in another storage service, in some embodiments.

Multiple users or clients may access a processing cluster 220 to obtain data warehouse services, in one embodiment. In at least some embodiments, a database service 210 may provide network endpoints to the clusters which allow the clients to send requests and other messages directly to a particular cluster. Network endpoints, for example, may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters 220 may provide an enterprise-class database query and management system that allows users to send data processing requests to be executed by the clusters 220, such as by sending a data processing request to a cluster control interface implemented by the processing clusters, in some embodiments. Processing clusters 220 may perform data processing operations with respect to data stored locally in a processing cluster. Requests sent to a processing cluster 220 may be directed to local data stored in the processing cluster, in some embodiments. Therefore, processing clusters may implement local data processing to plan and execute the performance of requests or other queries with respect to local data in the processing cluster in one embodiment. In some embodiments, the processing clusters may access or send processing instructions to data that is stored remote from the processing clusters, such as data stored in another service.

Processing clusters 220 may allow users of database service 210 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, subqueries, and aggregation, more efficiently, in various embodiments. Control plane 230 may direct scaling operations, as discussed above, to right-size a processing cluster 220 for efficiently processing queries.

Figure 3:
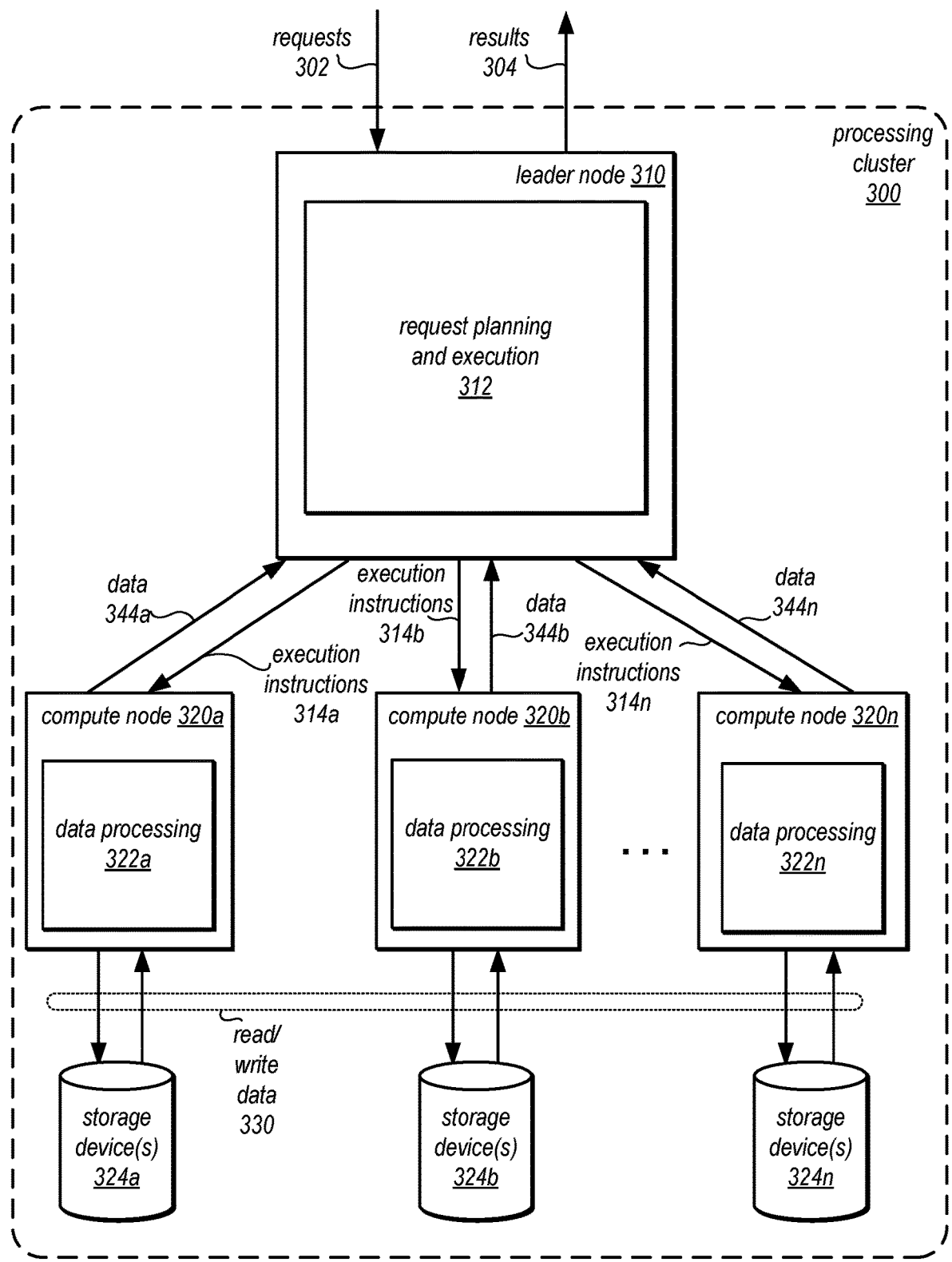
FIG. 3 is a logical block diagram illustrating a processing cluster of a database service that performs queries to a database hosted in the processing cluster, according to some embodiments.

FIG. 3 is a logical block diagram illustrating a processing cluster of a database service that performs queries to a database hosted in the processing cluster, according to some embodiments. Processing cluster 300 may be data warehouse service cluster, like processing clusters 220 discussed above with regard to FIG. 2, or another processing cluster that distributes execution of a query among multiple processing nodes, in one embodiment. As illustrated in this example, a processing cluster 300 may include a leader node 310 and compute nodes 320a, 320b, and 320n, which may communicate with each other over an interconnect (not illustrated), in one embodiment. Leader node 310 may implement request planning 312 to generate plan(s) and instructions 314 for executing various requests 302, such as query, or requests to update, add, modify, or remove data, on processing cluster 300, in one embodiment. Leader node 310 may implement metric planning history/performance metric collection (not illustrated) to collect and report performance metrics collected for various events, units of work, or other portions a query or other operation's performance, compute node or leader node performance, and history of operations performed, such as join history which may be provided to generate join history graphs from a live database, in some embodiments. As described herein, each node in a processing cluster 300 may include attached storage, such as storage device(s) 324a, 324b, and 324n, on which a database (or portions thereof) may be stored on behalf of clients (e.g., users, client applications, and/or storage service subscribers), in one embodiment.

Note that in at least some embodiments, data processing capability may be separated from compute nodes, and thus in some embodiments, additional components may be implemented for processing requests. Additionally, it may be that in some embodiments, no one node in processing cluster 300 is a leader node as illustrated in FIG. 3, but rather different nodes of the nodes in processing cluster 300 may act as a leader node or otherwise direct processing of requests to data stored in processing cluster 300, in one embodiment. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2, in one embodiment. For example, leader node 310 may be a server that receives an access request (e.g., a query for data or a request to add data) 302 from various client programs (e.g., applications) and/or subscribers (users), then parses them and develops an execution plan (e.g., query plan(s)) to carry out the associated database operation(s).

Leader node 310 may develop the series of steps necessary to obtain results for query 302, in one embodiment. Query 302 may be a query directed to a database table that is stored within processing cluster 300 (e.g., at one or more of compute nodes 320), in one embodiment. Leader node 310 may also manage the communications among compute nodes 320 instructed to carry out database operations for data stored in the processing cluster 300, in one embodiment. For example, node-specific request instructions 314 may be generated or compiled code that is distributed by leader node 310 to various ones of the compute nodes 320 to carry out the steps needed to perform a query or other operation in request 302, including executing the code to generate intermediate results of request 302 at individual compute nodes that may be sent back to the leader node 310, in one embodiment. Leader node 310 may receive data and responses or results (e.g., data 344a, 344b, and 344c) from compute nodes 320 in order to determine a final result for a request, in one embodiment. A database schema, data format and/or other metadata information for the data stored among the compute nodes, such as the data tables stored in the cluster, may be managed and stored by leader node 310 or obtained from a separate store (e.g., a data catalog service), in some embodiments. Request planning 312 may include the generation and selection of a plan to perform requests 302, in some embodiments.

Processing cluster 300 may also include compute nodes, such as compute nodes 320a, 320b, and 320n. Compute nodes 320, may for example, be implemented on servers or other computing devices, such as those described below with regard to computer system 1000 in FIG. 8, and each may include individual query processing "slices" defined, for example, for each core of a server's multi-core processor, one or more data processing engine(s), such as data processing 322a, 322b, and 322n, to execute the instructions 314 or otherwise perform the portions of the request plan assigned to the compute node, in one embodiment. Data processing 322 may access a certain memory and disk space in order to process a portion of the workload for a request that is sent to one or more of the compute nodes 320. Data processing 322 may access attached storage, such as 322a, 322b, and 322n, to perform operation(s), in one embodiment. For example, data processing 322 may scan data in attached storage 324, access indexes, perform joins, semi joins, aggregations, or any other processing operation assigned to the compute node 320, in one embodiment. Compute nodes 320 may send intermediate or final results from requests back to leader node 310 for final result generation (e.g., combining, aggregating, modifying, joining, etc.). Data, such as a database table, may be partitioned or otherwise distributed across the storage device(s) 324 as different partitions or shards of the data, in some embodiments. Compute nodes 320 may receive instructions specific to the shard(s) or partition(s) of the data to which the compute node 320 has access. Compute nodes 320 may implement metrics collection agents (not illustrated) in order to obtain the various performance metrics that may be collected for performing granular performance analysis for database queries.

Storage device(s), such as storage devices 324a, 324b, and 324n, may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 4:
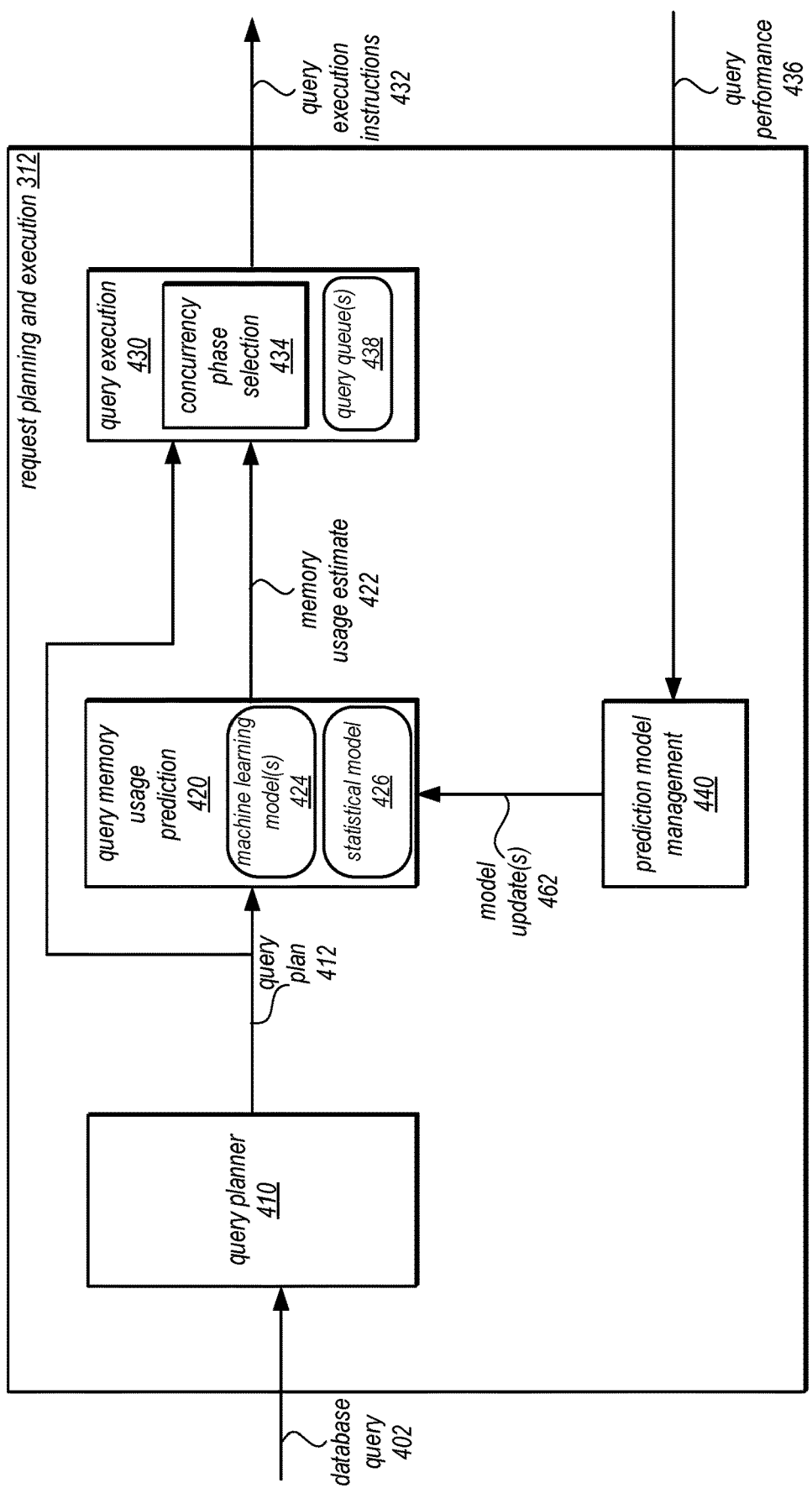
FIG. 4 is a block diagram illustrating request planning and execution that includes using dynamic concurrency level management for database queries, according to some embodiments.

FIG. 4 is a block diagram illustrating request planning and execution that includes using dynamic concurrency level management for database queries, according to some embodiments. As discussed above, request planning and execution 312 may receive database queries, such as database query 402, and direct the performance of the database query by issuing query execution instructions 432, in various embodiments. Request planning and execution 312 may implement a query planner 410, in various embodiments. Query planner 410 may perform various query planning techniques, such as generating a parse tree from a query statement, applying various rewrites or rules-based optimizations to modify the parse tree (e.g., reordering different operations such as join operations), generating different plans for performing the parsed/modified tree, and applying cost estimation techniques to determine estimated costs of the different plans in order to select a least costly plan as the query plan 412 to perform query 402.

Query plan 412 may be provided to query memory usage prediction 420, in some embodiments. Query memory usage predication 420 may determine a memory usage estimate 422. For example, query memory usage prediction may apply a machine learning model 424 trained to predict memory usage based on features of query plan 412. In some scenarios, the various query features needed to apply a machine learning model may not be ascertainable. For example, query plan 412 may indicate that query 402 may access external data or systems (e.g., copying data into the database, invoking an external performed operation, task, or service as part of the query, etc.). In such scenarios, a different prediction technique may be performed. For example, statistical model 426 may be implemented which maintains a running percentile of memory usage for queries which are classified as unable to be predicted using the machine learning model (e.g., a $95^{th}$ percentile of queries use X amount of memory or less), which may be used as a statistically likely memory usage estimate for the query.

Although not illustrated in FIG. 4, various other performance metrics or measurements may be determined for a query. For example, estimated processor usage, estimated network usage, estimated, I/O usage, variability measurements (e.g., coefficient of variation or squared coefficient of variation of one or more resource utilization measurements, including memory, etc.). Corresponding criteria for triggering transitions between various concurrency phases, as discussed below with regard to FIG. 5, may also be evaluated according to these performance metrics or measurements (e.g., threshold comparisons). Similar to memory usage machine learning models and/or statistical analysis may be used to predict or determine an estimated performance metric or measurement for a query, in some embodiments.

Query execution 430 may perform a query 402 according to the query plan 412 based on a concurrency phase for the database system. Various concurrency phases, as discussed below with regard to FIGS. 5-8, may be implemented in order have query execution dynamically increase or decrease the concurrency level for executing queries. Concurrency phase selection 434 may implement the various techniques discussed below with regard to FIGS. 5-8 to recognize and execute queries according concurrency phase. For example, in an expansion phase query execution 430 may determine whether or not available memory is sufficient for memory usage estimate 422 and if so increase the concurrency level to allow for concurrent execution of query 402. If available memory is not sufficient, then query 402 may be queued at query queue(s) 438 until an available execution slot within the concurrency level is free. For contraction phase, query execution may limit concurrent execution to a concurrency level determined as part of contraction phase (e.g., as discussed below with regard to FIG. 7), such that query 402 may execute or be queue at 438 according to whether an execution slot is available within the concurrency level. In contraction phase, concurrency phase selection 434 may use memory usage estimate 422 to determine when contraction phase may be exited. Similarly, query execution 430 may apply a different scheduling policy (e.g., shortest-job-first as opposed to a priority ordering) when an emergency phase is detected.

Query performance information 436 (e.g., execution time, memory usage, etc.), may be obtained (e.g., from compute nodes) and used to update memory usage prediction models, as indicated at 440. For instance, prediction model management 440 may collect training sets to update a machine learning model by taking a query plan 412 (not illustrated) and matching the query plan with an execution time received as part of query performance 436 to generate an updated version of machine learning model(s) 424 after receiving an amount of additional queries. In some embodiments, a separate machine learning system may be invoked by prediction model management 440 to train the machine learning model(s) 424. Prediction model management 440 may then make model updates 462. Similarly, prediction model management 440 may update the values for statistical model 426.

Figure 5:
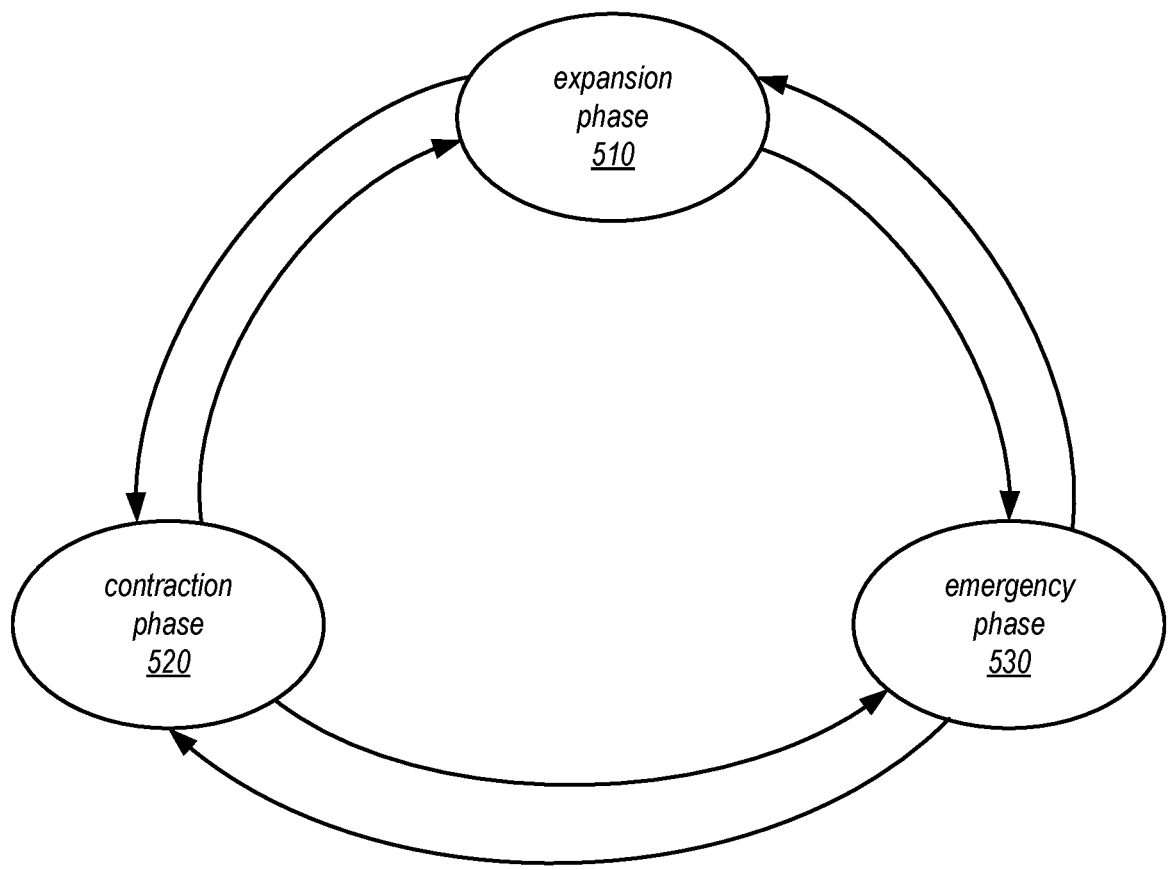
FIG. 5 is a logical block diagram illustrating different phases for dynamically managing concurrency levels for performing database queries, according to some embodiments.
Figure 6:
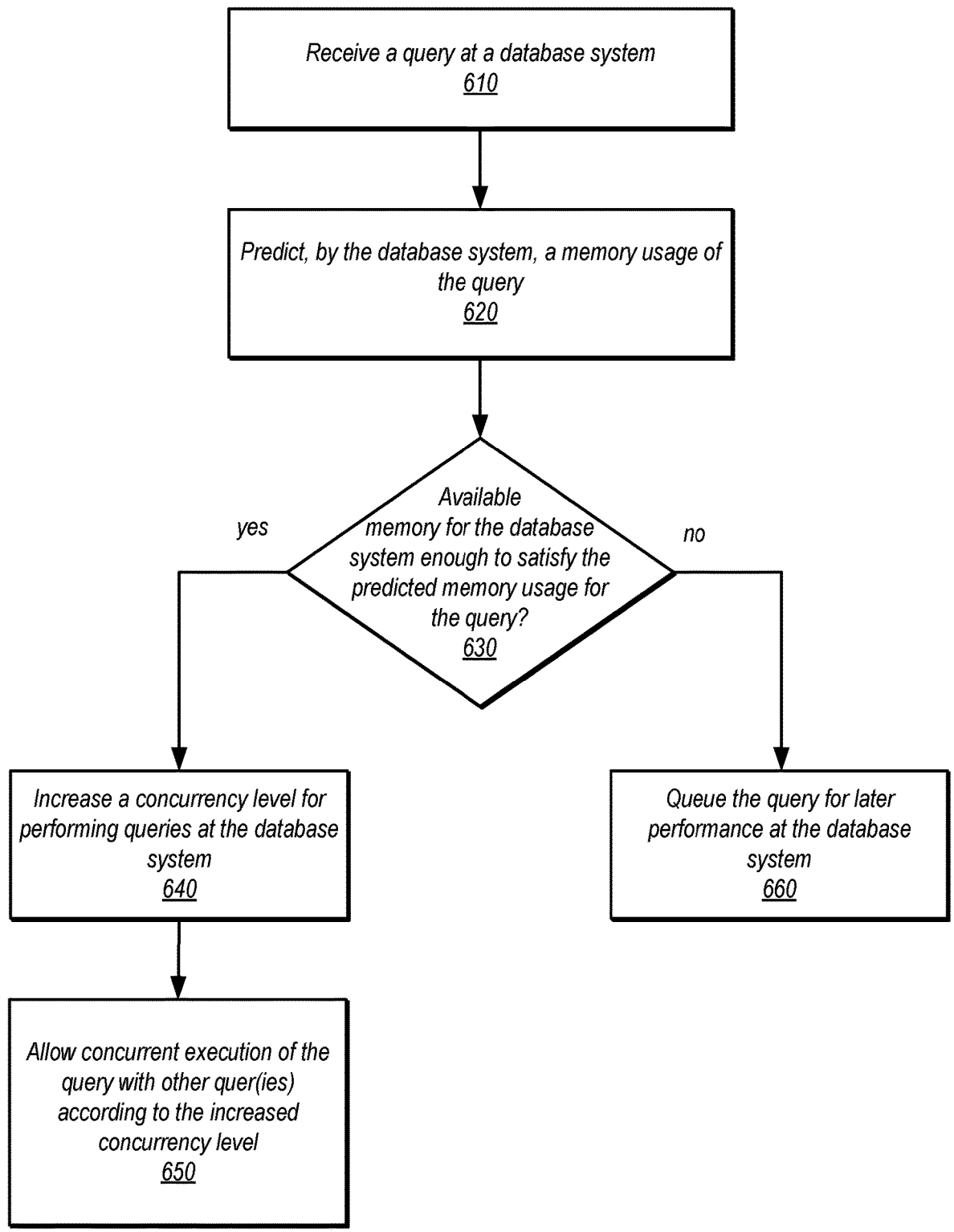
FIG. 6 is a high-level flowchart illustrating methods and techniques to implement dynamic concurrency level management for database queries, according to some embodiments.

FIG. 5 is a logical block diagram illustrating different phases for dynamically managing concurrency levels for performing database queries, according to some embodiments. As discussed above with regard to FIG. 4 and below with regard to FIGS. 6-8, different phases for managing concurrency levels for performing database queries may be used. In this way, concurrency levels can dynamically adapt to changing workloads in a database system. For example, an expansion phase 510 (e.g., discussed below with regard to FIG. 6) may allow for the number of concurrent queries to increase as queries are received by correspondingly increasing a concurrency level for the database system.

Expansion phase 510 may continue until other scenarios occur causing a phase change. For example, contraction phase 520 may be entered when a concurrency level begins to reduce database system performance. For example, as discussed in detail below with regard to FIG. 7, query execution may degrade when throughput of queries is determined to decrease. Similarly, other performance metrics, or measurements, as discussed above with regard to FIG. 4, may exceed or fall below threshold criteria. Contraction phase 520 may reduce concurrency levels to return database system performance to an optimal or otherwise non-degraded performance (even if some queries may have to wait to execute as the maximum concurrency level has been reached).

Expansion phase 510 may also continue until another scenario occurs, causing the database to enter emergency phase 530 for dynamic concurrency level management. Emergency phase 530 may occur when available memory is no longer available for queries such that short-running queries (e.g., queries less than some threshold amount of time, as discussed in detail below with regard to FIG. 8), are no longer able to execute, making the system appear to have stalled (even if long-running queries are still executing) as may be indicating by evaluating various liveness criteria. Emergency phase 530 may apply a different scheduling policy to prioritize liveness by executing some short-running queries instead of long-running queries (e.g., by preempting long running queries).

As depicted in FIG. 5, contraction phase 520 and emergency phase 530 can be exited to return to expansion phase 510. Similarly, contraction phase 520 and emergency phase 530 can also be exited to one another.

Although FIGS. 2-5 have been described and illustrated in the context of a database service, like a data warehousing system implementing a columnar relational database table, the various components illustrated and described in FIGS. 2-5 may be easily applied to other database or data storage systems that provide data processing on behalf of clients. As such, FIGS. 2-5 are not intended to be limiting as to other embodiments of a storage engine, query engine, processing cluster, or other component that may implement dynamic concurrency level management for database queries. FIG. 6 is a high-level flowchart illustrating methods and techniques to implement dynamic concurrency level management for database queries, according to some embodiments. Various different systems and devices may implement the various methods and techniques described below, either singly or working together. For example, a processing cluster, such as described above with regard to FIGS. 2-5 may implement the various methods. Alternatively, a combination of different systems and devices may implement the described techniques. Therefore, the above examples and or any other systems or devices referenced as performing the illustrated method, are not intended to be limiting as to other different components, modules, systems, or configurations of systems and devices.

As indicated at 610, a query may be received a database system, in various embodiments. The database query may be received according to various interfaces, formats, and/or protocols. For example, the database query may be formatted according to a query language such as Structured Query Language (SQL), in some embodiments, or may be specified according to an Application Programming Interface (API) for receiving queries. In at least some embodiments, the database query may be one query of many queries that can be submitted by one or many different users to a same database engine, processing platform, or system. For example, the database query may compete for computing resources along with other queries received from other users to be executed with respect to a database in some embodiments.

As indicated at 620, the memory usage of the query may be predicted by the database system, in various embodiments. Different memory prediction techniques may be used in some embodiments. For example, as discussed above with regard to FIG. 4, a machine learning model may be used, in some embodiments, which may generate a predicted memory usage for a query given various query features (e.g., determined from a query execution plan). In some scenarios, the various query features needed to apply a machine learning model may not be ascertainable. For example, a query may access external data (e.g., copying data into the database, invoking an external performed operation, task, or service as part of the query, etc.). In such scenarios, a different prediction technique may be performed. For example, a running percentile of memory usage for queries which are classified as unable to be predicted using the machine learning model (e.g., P95), may be used as a statistically likely memory usage for the query.

As indicated at 630, a determination may be made as to whether available memory for the database system is enough to satisfy the predicted memory usage for the query, in some embodiments. For example, available memory may be determined as an amount not allocated to or in use by threads or other execution objects for currently executing queries (and other database system uses). If the amount of available memory is larger than the predicated usage amount, then the available memory may be sufficient.

If, as indicated by the positive exit from 630, available memory is enough to satisfy the predicted memory usage, then a concurrency level for performing queries at the database system may be increased, as indicated at 640, in some embodiments. For example, the concurrency level may be increased by 1 to allow 1 more query to be executed concurrently. As indicated at 650, concurrent execution of the query may be allowed with other quer(ies) according to the increased concurrency level, in some embodiments. For example, the increased concurrency threshold may no longer bar concurrent execution of the query (as may be the case if the concurrency level were not increased).

If, as indicated by the negative exit from 630, available memory is not enough to satisfy the predicted memory usage, then the query may be queued for subsequent performance, as indicated at 660, in some embodiments.

Figure 7:
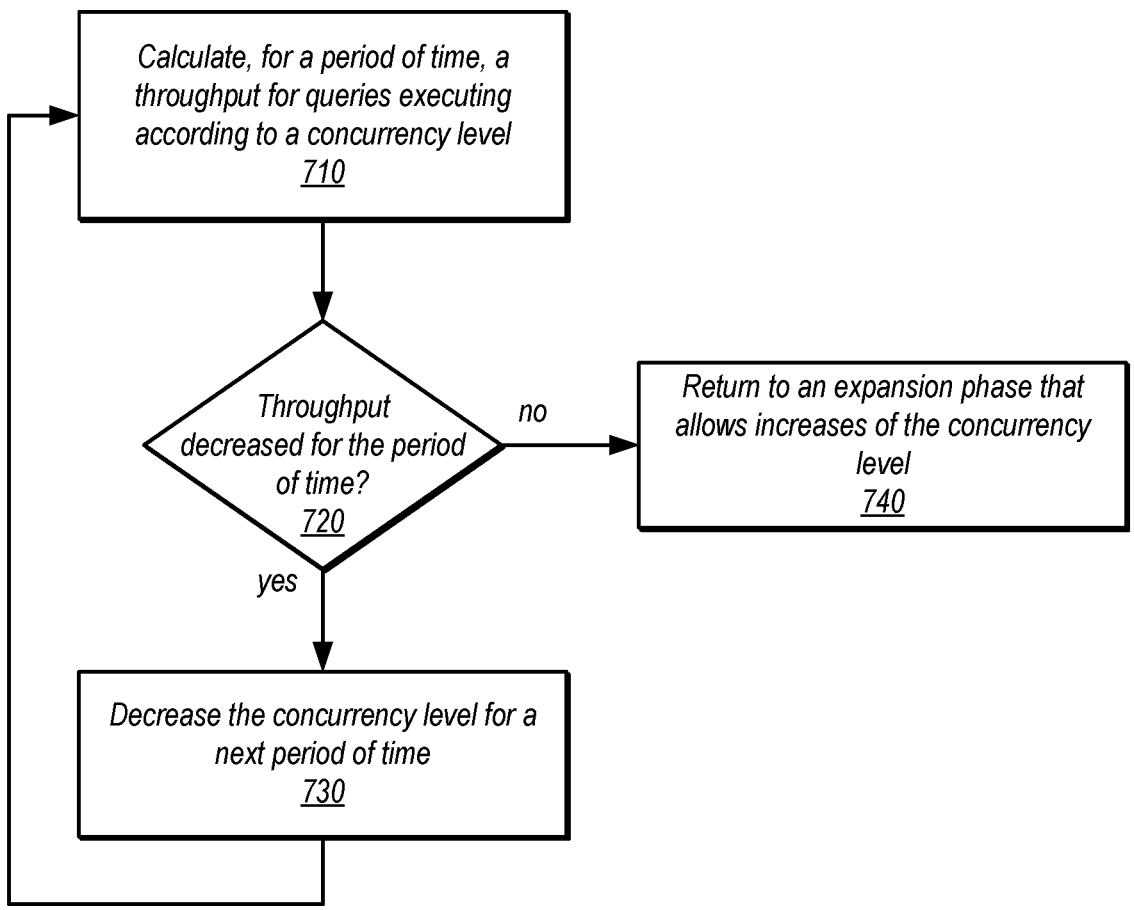
FIG. 7 is a high-level flowchart illustrating methods and techniques to implement a contraction phase for dynamic concurrency level management, according to some embodiments.

As discussed above with regard to FIG. 5, in some circumstances, concurrent execution of a query may no longer lead to optimal performance for queries. When such a situation occurs, a database system may begin to dynamically decrease concurrency levels to an optimal level by entering a contraction phase. FIG. 7 is a high-level flowchart illustrating methods and techniques to implement a contraction phase for dynamic concurrency level management, according to some embodiments.

As indicated at 710, a throughput for queries executing according to a concurrency level may be calculated for a period of time, in some embodiments. For example, a total number of queries that completed execution within the period of time (e.g., 1,000 queries per minute) may be calculated. As indicated at 720, the throughput calculated for the period of time may be evaluated to determine whether or not throughput decreased for the period of time, in some embodiments. For example, the throughput for the period of time may be compared with a throughput calculated for an immediately prior period of time to detect the decrease. In some embodiments, a Utilization Law may be applied to detect decreased throughput. For example, if X=throughput for the period of time and S=average query time (sum of runtime of queries/number of queries finished or running), then a utilization U may be determined as U=XS/c, where c equals the concurrency level for the period of time. If the value of U is less than 1, then throughput may be said to have decreased for the period of time.

A contraction phase may be entered when throughput is decreased, in some embodiments. As indicated at 730, the concurrency level may be decreased for a next time period, in some embodiments. For example, the concurrency level may be decreased by a fixed amount (e.g., by 2) or in some embodiments may be decreased corresponding to the decrease in throughput. For example, the new concurrency level may be determined by multiplying the old concurrency level by the utilization U (e.g., c*U). A decreased concurrency level may be enforced for a database system, in various embodiments, so that no increase to the concurrency level may be determined for that next period of time (e.g., as would occur in an expansion phase).

A database system may return to an expansion phase from a contraction phase, in various embodiments, when the throughput is no longer decreased for a period of time, as indicated by the negative exit from 720, allowing increases to the concurrency level, as indicated at 740.

As discussed above with regard to FIG. 5, in some circumstances, concurrent execution of queries could allow long running queries that utilize a large amount of memory to block other queries from executing (e.g., smaller or short-running queries), creating the appearance of a database system stall. A phase of dynamic concurrency level management may be used to alleviate this by detecting these circumstances and utilizing an emergency phase to retain liveness for the database system. FIG. 8 is a high-level flowchart illustrating methods and techniques to implement an emergency phase for dynamic concurrency level management, according to some embodiments.

As indicated at 810, a memory usage may be predicted for a received query, in various embodiments. As discussed above with regard to FIG. 6, a machine learning model and/or other prediction techniques may be implemented, such as the use of a historically determine memory usage for the query. As indicated at 820, a determination may be made as to whether liveness criteria is satisfied, in some embodiments. If so, then the database system may remain in a non-emergency phase (e.g., a contraction phase or emergency phase), as indicated at 840, in some embodiments.

Various different liveness criteria may be evaluated and/or implemented, in some embodiments. For example, liveness criteria may include a determination as to whether there is enough memory to satisfy the predicted memory usage for the query. In some embodiments, other liveness criteria may also be evaluated in addition to available memory. For example, if there is not enough available memory to satisfy the query then a further evaluation may be performed. For example, an evaluation may be made as to the estimated time remaining for currently executing queries with respect to a threshold is exceeded, in some embodiments. Estimated time remaining for queries may, in various embodiments, be determined using a prediction model, such as a machine learning model similar to the machine learning model used to estimate query size. Instead, this machine learning model may be trained to predict a total execution time for a query (e.g., by training the model on a set of previously executed queries at the database system according to their tracked execution times and query plans generated to perform the queries as the training input data and labeled result respectively for supervised training methods). The current execution time for an executing query (still not completed) may then be subtracted from the predicted total execution time to determine an estimated time remaining for the query.

In some embodiments, individual estimated time remaining for each currently executing query may be compared with the threshold (e.g., one minute). If all of those queries have estimated time remaining (e.g., each estimated time for each query is more than one minute), then an emergency phase may be entered. Note that in other embodiments, other time remaining evaluations may be performed (e.g., a percentage of currently executing queries above the threshold or an average of estimated time remaining for queries above a threshold). Other liveness criteria may also be evaluated in addition to available memory, which may be indicative of whether the database system appears live to a client application. For example, a queue length, such as a number of queries waiting to be processed in a queue, may be longer than threshold size or number (e.g., 10 or more waiting queries).

As indicated at 830, an emergency phase scheduling policy may be applied to select queries for execution, in some embodiments. For example, a contraction phase and extraction phase may rely upon a priority scheduling technique that orders queries in a queue (or multiple queues) according to a priority value and takes the next available query in the queue when selecting a new query for execution. An emergency phase scheduling policy may be implemented to return the database system to the appearance of "liveness" by selecting shorter queries (even if not next in the priority ordering). For example, the emergency phase scheduling policy may be a shortest-job-first scheduling policy. As noted above, prediction of query execution time can be made (e.g., using a trained machine learning model). These predicted query execution times can be used to make query selections according to the emergency phase scheduling policy. In at least some embodiments, a currently executing query may be preempted to execute a selected query (e.g., a predicted long-running query may be preempted to execute a predicted short-running query).

As indicated by the loop back from 830 to 820, an emergency phase scheduling policy may continue to be applied as long as liveness criteria are not satisfied (e.g. enough available memory to execute a query according to the query's predicted memory usage and a number of queries in the queue exceeds a threshold number). When liveness criteria is satisfied, then, as indicated by the positive exit to 840 a return to a non-emergency phase may be made, which may allow for a different scheduling policy and, in the case of returning to an expansion phase, allowing for the adjustment of concurrency levels to increase.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
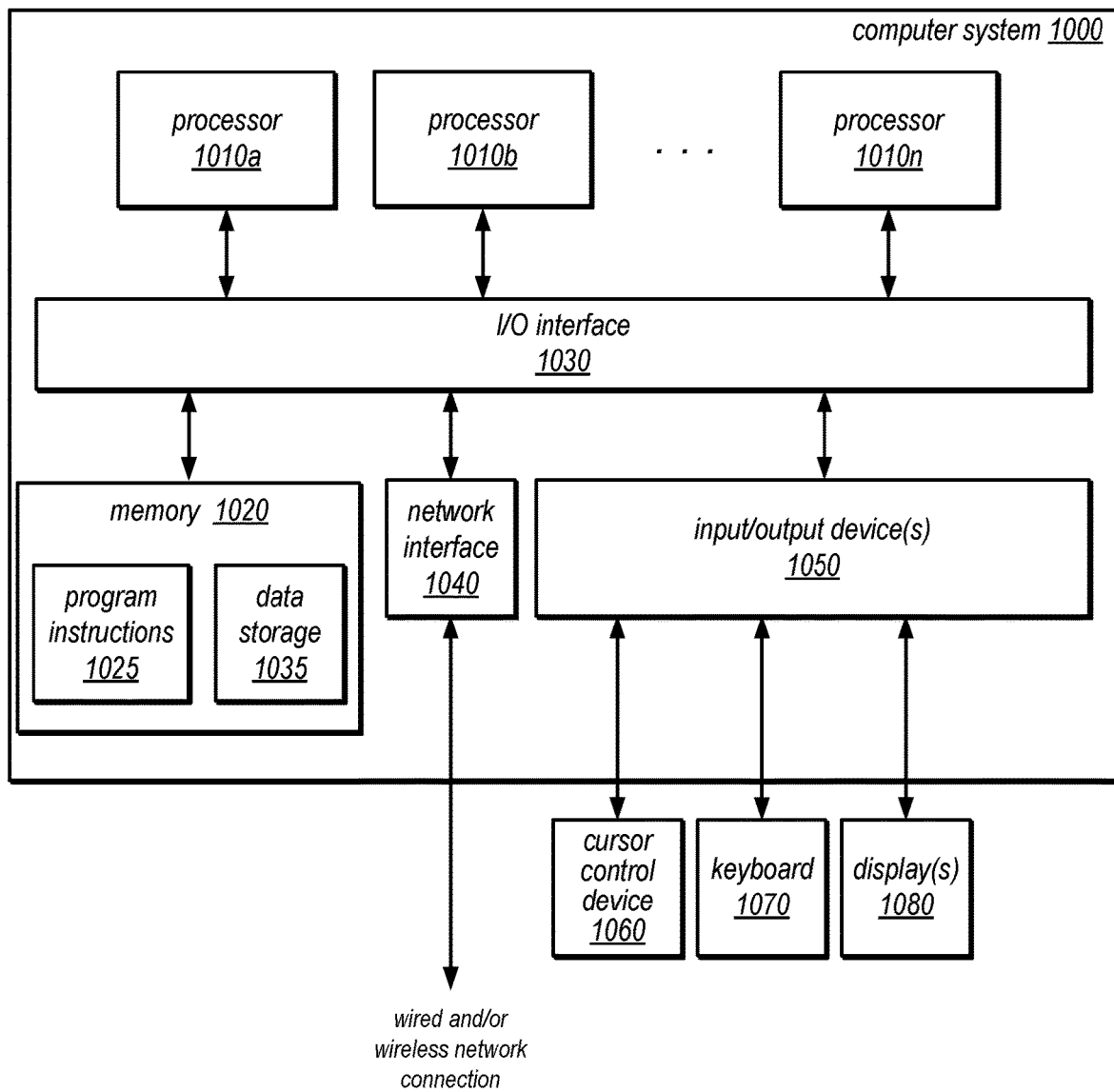
FIG. 9 illustrates an example system to implement the various methods, techniques, and systems described herein, according to some embodiments.

Embodiments of dynamic concurrency level management for database queries as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as various techniques for implementing dynamic concurrency level management for database queries as described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, may implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a database system, configured to:
   execute a plurality of received queries concurrently according to a concurrency level for performing queries at the database system;
   receive an additional query;
   determine a memory usage estimate for the additional query;
   compare the memory usage estimate with available memory for the database system remaining from the concurrent execution of the plurality of received queries;
   based on the comparison, determine that the available memory is enough to satisfy the memory usage estimate for the query;
   identify a phase of a plurality of different phases for dynamically managing concurrency levels as applicable to the database system, wherein the phase is identified based on a throughput of the plurality of received queries concurrently executing;
   according to the determination that the available memory is enough to satisfy the memory usage estimate for the query and the identified phase for dynamically managing concurrency levels, increase the concurrency level; and
   allow the execution of the additional query concurrently with the plurality of received queries according to the increased concurrency level for performing queries.

2. The system of claim 1, wherein the database system is further configured to:
   calculate, for a period of time, a throughput for concurrently executing queries;
   determine that the throughput decreased for the period of time; and
   responsive to the determination that the throughput decreased for the period of time, decrease the concurrency level for a next period of time.

3. The system of claim 1, wherein the identified phase is an expansion phase, and wherein the database system is further configured to:
   receive a second query;
   predict a second memory usage for the second query;
   determine, based on the second memory usage for the second query, that liveness criteria for the database system is not satisfied;
   responsive to the determination that the liveness criteria for the database system is not satisfied, change from the expansion phase to an emergency and apply an emergency phase scheduling policy to select queries for execution.

4. The system of claim 1, wherein the database system is a processing cluster implemented as part of a data warehouse service offered by a provider network, wherein the processing cluster includes a leader node that performs the determination of the memory usage estimate for the query, the comparison of the memory usage estimate with the available memory, the increase of the concurrency level, and the allowance of the execution of the query in response to a request to enable automatic concurrency level management received via an interface for the data warehouse service.

5. A method, comprising:
   receiving a query at a database system;
   predicting, by the database system, a memory usage of the query;
   determining, by the database system, that available memory of the database system is enough to satisfy the predicted memory usage for the query;
   identifying, by the database system, a phase of a plurality of different phases for dynamically managing concurrency levels as applicable to the database system, wherein the phase is identified based on a throughput of one or more executing queries;
   according to the determination that the available memory of the database system is enough to satisfy the predicted memory usage for the query and the identified phase for dynamically managing concurrency levels, increasing, by the database system, a concurrency level for performing queries at the database system to allow execution of the query concurrently with the one or more executing queries.

6. The method of claim 5, further comprising:
   receiving, by the database system, a second query;
   predicting, by the database system, a second memory usage of the second query;
   determining, by the database system, that the available memory of the database system is not enough to satisfy the predicted memory usage of the second query; and
   responsive to determining that the available memory of the database system is not enough to satisfy the predicted memory usage of the second query, queuing the second query for subsequent execution.

7. The method of claim 5, further comprising:
   calculating, by the database system for a period of time, a performance measurement for concurrently executing queries at the database system;
   determining, by the database system, that the performance measurement fails to satisfy a performance criteria for the period of time; and
   responsive to determining that the performance measurement failed to satisfy the performance criteria for the period of time, decreasing, by the database system, the concurrency level for a next period of time.

8. The method of claim 5, wherein predicting the memory usage of the query comprises:
generating a plan to execute the query;
determining a plurality of features from the plan as input for a machine learning model trained to predict memory usage of queries; and
applying the machine learning model to the input to determine the predicted memory usage of the query.

9. The method of claim 8, wherein the machine learning model is trained using a plurality of previously performed queries by the database system.

10. The method of claim 5, wherein predicting the memory usage of the query comprises maintaining a history of memory usage of previous queries with a same classification as the query, wherein the memory usage estimate is determined from the history of memory usage.

11. The method of claim 5, wherein the identified phase is an expansion phase and wherein the method further comprises:
receiving, by the database system, a second query;
predicting, by the database system, a second memory usage of the second query;
determining, by the database system, that liveness criteria for the database is not satisfied based, at least in part, on the second predicted memory usage of the second query; and
responsive to determining that the liveness criteria for the database system is not satisfied, changing, by the database system from the expansion phase to an emergency phase and applying, by the database system, an emergency phase scheduling policy to select queries for execution.

12. The method of claim 11, further comprising:
receiving, by the database system, a third query;
predicting, by the database system, a third memory usage of the third query;
determining, by the database system, that the liveness criteria for the database system is satisfied based, at least in part, on the third predicted memory usage of the third query;
responsive to determining that the liveness criteria for the database system is satisfied based, at least in part, on the third predicted memory usage of the third query, returning, by the database system, to the expansion phase that allows increases of the concurrency level and applying an expansion phase scheduling policy.

13. The method of claim 5, wherein the database system is a database service implemented as part of a provider network, wherein the predicting, the determining, and the increasing are enabled for the database system according to a request to enable automatic concurrency level management received via an interface for the database service.

14. One or more non-transitory, computer-readable storage media, storing program instructions that when executed on or across one or more computing devices cause the one or more computing devices to implement a database system that implements:
receiving a query;
determining a memory usage estimate for the query;
comparing the memory usage estimate with available memory for the database system;
determining that the available memory is enough to satisfy the memory usage estimate for the query;
identifying a phase of a plurality of different phases for dynamically managing concurrency levels as applicable to the database system, wherein the phase is identified based on a throughput of one or more executing queries;
according to the determination that the available memory of the database system is enough to satisfy the predicted memory usage for the query and the identified phase for dynamically managing concurrency levels, increasing a concurrency level for performing queries at the database system; and
allowing the execution of the query concurrently with the one or more executing queries according to the increased concurrency level for performing queries.

15. The one or more non-transitory, computer-readable storage media of claim 14, wherein, in determining the memory usage estimate for the query, the program instructions cause the database system to implement:
generating a plan to execute the query;
determining a plurality of features from the plan as input for a machine learning model trained to predict memory usage of queries; and
applying the machine learning model to the input to determine the predicted memory usage of the query.

16. The one or more non-transitory, computer-readable storage media of claim 14, wherein, in determining the memory usage estimate for the query, the program instructions cause the database system to implement maintaining a history of memory usage of previous queries with a same classification as the query, wherein the memory usage estimate is determined from the history of memory usage.

17. The one or more non-transitory, computer-readable storage media of claim 14, wherein the identified phase is an expansion phase and wherein the one or more non-transitory, computer-readable storage media store further instructions that when executed on or across the one or more computing devices, cause the database system to further implement:
receiving a second query;
determining a second memory usage estimate for the second query;
determining that liveness criteria for the database system is not satisfied based, at least in part, on the second memory usage estimate for the second query;
responsive to determining that liveness criteria for the database system is not satisfied, changing from the expansion phase to an emergency phase and applying an emergency phase scheduling policy to select queries for execution.

18. The one or more non-transitory, computer-readable storage media of claim 14, storing further instructions that when executed on or across the one or more computing devices, cause the database system to further implement:
calculating, for a period of time, a throughput for concurrently executing queries;
determining that the throughput decreased for the period of time; and
responsive to determining that the throughput decreased for the period of time, decreasing the concurrency level for a next period of time.

19. The one or more non-transitory, computer-readable storage media of claim 18, storing further instructions that when executed on or across the one or more computing devices, cause the database system to further implement:
calculating, for the next period of time, a second throughput for concurrently executing queries;
determining that the second throughput for the period of time did not decrease; and
responsive to determining that the second throughput did not decrease for the next period of time, returning from a contraction phase of the plurality of different phases to an expansion phase of the plurality of different phases that allows increases of the concurrency level.

20. The one or more non-transitory, computer-readable storage media of claim 14, wherein the determining of the memory usage estimate for the query, the comparing of the memory usage estimate with the available memory, the increasing of the concurrency level, and the allowing of the execution of the query is performed in response to a request to enable automatic concurrency level management received via an interface for the database system.

\* \* \* \* \*